Figure 1:
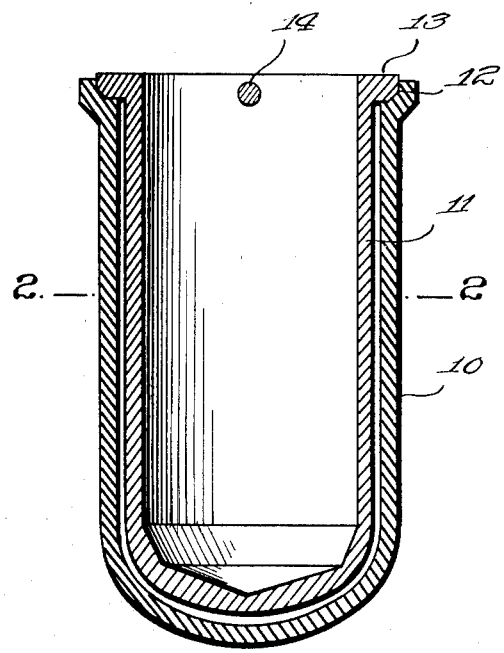

Dec. 5, 1933.  E. H. MORSE  1,937,836
PROCESS OF FORMING VISCOSE PRODUCTS
Filed Jan. 16, 1928

Inventor
EARLE H. MORSE

By
C. H. Parker
Attorney

Patented Dec. 5, 1933

1,937,836

UNITED STATES PATENT OFFICE 1,937,836

PROCESS OF FORMING VISCOSE PRODUCTS

Earle H. Morse, Nutley, N. J.

Application January 16, 1928. Serial No. 247,246

9 Claims. (Cl. 18—57)

This invention relates to a process of forming viscose products, and more particularly to a process for the production of thin walled shrinkable molded viscose products, such as bottle caps, bottle sleeves, and the like.

An important object of the invention is to provide a simple, efficient and relatively inexpensive method of producing viscose products of the character referred to.

Another object of the invention is to provide a process of the character above mentioned by which the objectionable features incident to the present manufacture of shrinkable viscose products by hand, are eliminated.

A further object of the invention is to provide a process by which such viscose products having walls of even thickness throughout, or walls of desired varying thickness, may be produced.

A further object is to provide viscose products such as bottle caps adapted to hold bottle stoppers in place and protect the same, or bottle sleeves which may be employed on the necks of bottles for decorative purposes, which may be secured to the bottles by machinery instead of by hand as is the present practice.

Other objects and advantages of the invention will become apparent from the following description.

Viscose bottle caps and sleeves adapted to cover the tops of bottles, both for decorative purposes and also in order to hold the bottle stoppers more firmly in place, have been made by dipping a mold, which is generally of glass, into a properly ripened viscose solution in order to form a layer or coating of the viscose solution on the walls of the mold. The mold is thereafter removed from the viscose solution and is inverted in order to prevent the formation of a thick drop which otherwise would be formed at the bottom of the product; after which it is inverted again and dipped into a coagulating bath of sulfuric acid containing salts or other coagulating medium. The product is then stripped from the mold, washed in sulfuric acid and in numerous changes of water, desulfurized by washing in a sodium sulfite or equivalent solution, again washed in water, bleached, dyed, trimmed by hand, and shipped in a wet condition to the bottler. When the viscose cap which has been placed on the bottle in its wet condition, begins to dry, it shrinks thereby tightly securing the stopper in the bottle.

Such a process for the production of viscose caps has the disadvantage that its practice involves expensive handling. Furthermore, the walls of the products produced by such a process are uneven in thickness due to the fact that the process is a manual one and that the wall thicknesses will vary, according to the particular manipulation practiced by the worker. Due to the step of inverting the mold in order to prevent the formation of a drop of the viscose solution on the bottom of the product, the length of the articles varies, which necessitates making them longer than the length required in the finished article and trimming them to standard length, resulting in a loss of materials. Because of the natural irregularities of trimming, viscose bottle caps and sleeves made by such a process cannot be handled and placed on bottles by machinery.

I have discovered that thin walled shrinkable viscose products of the character referred to can successfully be produced by coagulating the viscose solution while in a mold. I have found that a properly made viscose solution of the character now commonly used in making viscose bottle caps and sleeves which has been ripened for about three days at approximately 15° C., preferably at a temperature slightly below 15° C., (14–14½° C.) can be coagulated in a thin film when heated in a mold at a temperature of from 65 to 80° C., for about five to ten minutes. Other times and temperatures or other methods of ripening viscose may likewise be employed. The time required for the coagulation of the viscose solution obviously depends upon various factors such as the thickness of the metal forming the mold and upon the ease with which heat is transmitted through the particular material of which the mold is made, the mold being heated externally. The resulting product shrinks somewhat upon coagulation and may be readily removed from the mold, after which it is treated with an acid regenerating bath, such for example as the usual regenerating bath of sulfuric acid containing salts, desulfurized according to the usual process of desulfurizing viscose products, in a sodium sulfite or equivalent solution, bleached in the usual way and washed. If desired, any further finishing steps such as dyeing may be employed to give the viscose products a decorative finish.

Figure 2:
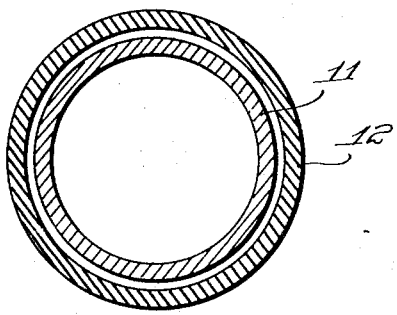

In the accompanying drawing I have shown a preferred embodiment of a mold which may be employed in the practice of my process. In this showing, Figure 1 is a vertical section of the mold, and Figure 2 is a section on line 2—2 of Figure 1.

Referring to the drawing, the numeral 10 designates an outer mold member which may be made of any suitable material such as iron, steel, copper, aluminum, but which I prefer to make of chromium-plated yellow brass. An inner mold member 11 which is adapted to be forced by hand or otherwise into the mold member 10, preferably also is made of plated brass. The outside diameter of the member 11 is less than the inside diameter of the mold member 10, the difference in diameters of these two mold parts determining the thickness of the molded articles.

The mold member 10 is formed adjacent its top with a groove 12 adapted to receive, by an easy sliding fit, the rim 13 of the member 11. The rim 13 of the inner mold member is made to correspond in shape to the recess 12 in the outer mold member as shown. The member 11 is provided adjacent its top with a rod or handle 14 by means of which the member 11 may be inserted by hand or otherwise into and removed from the member 10.

In employing a mold such as shown by way of example in the accompanying drawing, a suitable quantity of a viscose solution which has been ripened is inserted into the mold member 10 while the inner member 11 is withdrawn, and the inner member then forced into the mold until the lip 13 is seated in the correspondingly shaped groove 12. The charged mold is then subjected to heat in accordance with the conditions hereinbefore described in order to coagulate the viscose solution, after which the member 11 is withdrawn and the molded article removed. The molded viscose article after regeneration may then be treated in accordance with any known or desired finishing steps.

Viscose products of the character referred to made by my process have the advantage over articles produced according to processes heretofore known that they are molded to the exact size desired and therefore do not have to be trimmed. They have walls of even thickness or of any desired thickness according to the particular form of mold and plunger employed in the molding operation. Moreover, they are of uniform character and therefore may be handled and placed on bottles or the like by machinery, thereby resulting in a substantial saving in labor. Due to the fact that the shape of the mold controls the shape of the molded product, the products do not have the disadvantage incident to the production of such articles manually, that the shoulder of the cap which must withstand the greatest strain usually is the thinnest part of the article. The space between the inner face of the member 10 and the outer face of the member 11 positively determines the thickness of the molded article so that the article may be produced having a greater thickness at any point where it will be subjected to the greatest strain.

While in the drawing I have shown a form of mold adapted to produce viscose caps for bottles, it will be apparent that other articles such as viscose "sleeves" which are somewhat similar in appearance to short lengths of sausage casings may be produced by employing a suitably shaped mold. Indeed they may be made by a continuous process where the viscose solution is squirted continuously between two concentric heated cylinders. These sleeves after being dyed, are slipped on to the neck of a bottle and when dried, shrink and adhere to the neck of the bottle giving it a decorative finish.

Notwithstanding the known disadvantages of producing thin shrinkable viscose caps and sleeves in accordance with the present practice as hereinbefore set forth, which practice has remained substantially unchanged for many years, it heretofore has been considered in this art that it would be impossible to produce such viscose articles by a molding process. I have found however, that my molding process produces practically, inexpensively and efficiently such molded articles superior in character and appearance and equal in finish to the best products of the present hand process.

While I have described in detail the preferred practice of my process and the materials which I prefer to employ, and have shown one form of mold adapted for use in the practice of my invention, it is to be understood that I am not limited thereto except as set forth in the subjoined claims.

I claim:

1. The process of forming thin, shrinkable viscose products which comprises coagulating without substantially drying or regenerating a viscose solution in a mold by subjecting it to heat, and regenerating and desulfurizing the coagulated product.

2. The process of forming thin, shrinkable viscose products which comprises coagulating a viscose solution in a mold without substantially regenerating the viscose by subjecting it to a temperature of about 65° to 80° C., for from approximately five to ten minutes, and treating the coagulated product with an acid regenerating bath and with a desulfurizing bath.

3. The process of producing thin, shrinkable viscose products which comprises introducing a ripened viscose solution into a mold of desired shape, heating the mold to coagulate without substantially drying or regenerating the viscose, and treating the coagulated product with a regenerating bath and a desulfurizing bath.

4. The process of producing thin, shrinkable viscose products which comprises ripening a viscose solution for several days, introducing the viscose solution into a mold of desired shape, coagulating without drying or regenerating the viscose solution by subjecting it to heat, and treating the coagulated product with an acid regenerating bath and a desulfurizing bath.

5. The process of producing thin, shrinkable viscose products which comprises ripening a viscose solution for about three days, introducing the viscose solution into a mold of desired shape, and coagulating the viscose solution by subjecting it to a temperature of about 65 to 80° C. without substantially regenerating the viscose, and treating the coagulated product with an acid regenerating bath and desulfurizing bath.

6. The herein described process of forming bottle caps which comprises introducing a viscose solution into a mold of the desired shape, coagulating the viscose without substantially drying or regenerating the same by heating the mold, forming a shrinkable bottle cap by treating the coagulated product with an acid regenerating bath and subjecting the regenerated product to a finishing process.

7. In a process of forming thin, shrinkable, viscose products, the step which comprises coagulating without substantially drying or regenerating a viscose solution in a mold by subjecting it to heat.

8. In a process of forming thin, shrinkable viscose products, the step which comprises coagulating a viscose solution in a mold without substantially regenerating the viscose by subjecting it to a temperature of about 65° to 80° C., for from approximately five to ten minutes.

9. In a process of forming thin, shrinkable viscose products, the steps of introducing a ripened viscose solution into a mold of the desired shape, and heating the mold to coagulate the viscose, the amount and time of heating being insufficient to substantially dry or regenerate the viscose.

EARLE H. MORSE.